US010767471B2

(12) United States Patent
Olsen et al.

(10) Patent No.: US 10,767,471 B2
(45) Date of Patent: Sep. 8, 2020

(54) RESOURCE DENSITY SCREENING TOOL

(71) Applicant: ConocoPhilips Company, Houston, TX (US)

(72) Inventors: Christopher S. Olsen, Houston, TX (US); Andrew D. Dewhurst, Houston, TX (US); Gerald E. Michael, Houston, TX (US); Anita E. Csoma, Houston, TX (US); Arijit Mitra, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 163 days.

(21) Appl. No.: 15/981,573

(22) Filed: May 16, 2018

(65) Prior Publication Data
US 2018/0334902 A1 Nov. 22, 2018

Related U.S. Application Data

(60) Provisional application No. 62/508,174, filed on May 18, 2017.

(51) Int. Cl.
E21B 49/00 (2006.01)
E21B 49/08 (2006.01)
G01V 99/00 (2009.01)
E21B 47/06 (2012.01)

(52) U.S. Cl.
CPC .............. E21B 49/00 (2013.01); E21B 49/08 (2013.01); G01V 99/005 (2013.01); E21B 47/06 (2013.01); E21B 47/065 (2013.01); E21B 2049/085 (2013.01)

(58) Field of Classification Search
CPC ......... E21B 49/00; G01V 99/005; G01V 9/02
USPC ..................... 702/11, 2; 703/10
See application file for complete search history.

(56) References Cited

U.S. PATENT DOCUMENTS

| | | | |
|---|---|---|---|
| 6,549,879 B1 * | 4/2003 | Cullick ................... | E21B 49/00 703/10 |
| 6,823,298 B1 * | 11/2004 | Jones ................. | G01N 33/2823 703/10 |
| 8,150,669 B2 * | 4/2012 | Cacas .................... | G01V 99/00 345/423 |
| 8,271,243 B2 * | 9/2012 | Koutsabeloulis ...... | G01V 11/00 703/6 |
| 8,428,924 B2 * | 4/2013 | Shook .................... | E21B 43/00 166/245 |
| 8,483,965 B2 | 7/2013 | Bradley et al. | |
| 8,640,771 B2 | 2/2014 | Pope et al. | |

(Continued)

FOREIGN PATENT DOCUMENTS

WO 2016100762 A1 6/2016

OTHER PUBLICATIONS

International Search Report—PCT/US2018/033019 dated Aug. 1, 2018; 4 pgs.

(Continued)

Primary Examiner — Kenneth L Thompson

(57) ABSTRACT

A tool for screening unconventional reservoirs to determine the location of economically important accumulations of hydrocarbons early in a reservoir development process is described. Once the accumulations are identified, subsequent process such as drilling wells and producing hydrocarbons can begin.

24 Claims, 12 Drawing Sheets

(56) References Cited

U.S. PATENT DOCUMENTS

| | | | |
|---|---|---|---|
| 8,849,640 B2* | 9/2014 | Holl | E21B 47/022 |
| | | | 703/10 |
| 9,411,915 B2* | 8/2016 | Bouzarkouna | G06F 17/5009 |
| 10,221,659 B2* | 3/2019 | Baranov | E21B 43/00 |
| 10,408,055 B2* | 9/2019 | Soofi | E21B 47/02224 |
| 2002/0133323 A1 | 9/2002 | Dahlberg | |
| 2010/0326669 A1 | 12/2010 | Zhu et al. | |
| 2011/0208431 A1 | 8/2011 | Skelt | |
| 2012/0143577 A1* | 6/2012 | Szyndel | E21B 49/00 |
| | | | 703/10 |
| 2012/0253770 A1* | 10/2012 | Stern | G01V 11/00 |
| | | | 703/10 |
| 2012/0316789 A1 | 12/2012 | Suarez-Rivera et al. | |
| 2013/0096896 A1* | 4/2013 | Al-Shahri | E21B 43/00 |
| | | | 703/10 |
| 2013/0110571 A1 | 5/2013 | Saleri et al. | |
| 2014/0214387 A1* | 7/2014 | Tilke | E21B 43/305 |
| | | | 703/10 |
| 2014/0379312 A1 | 12/2014 | Dedontney et al. | |
| 2015/0301219 A1 | 10/2015 | Bryndzia et al. | |
| 2016/0124115 A1 | 5/2016 | Theologou et al. | |

OTHER PUBLICATIONS

Glaser, Karen Sullivan, et al—"Seeking the Sweet Spot Reservoir and Completion Quality in Organic Shales", Oilfield Review, Winter 2013-2014, vol. 25, Issue No. 4, pp. 16-29; 14 pgs.

CycloLog, "Tutorial-Petrophysics Module", CycloLog Version 2016 Tutorial—Petrophysics module, ENRES International, Sep. 2016; 54 pgs.

Mireault, Ray, et al—"Reservoir Engineering for Geologists", Oct. 2007-Dec. 2007,CSPG Reservoir Magazine, Fekete.com; 57 pgs.

\* cited by examiner

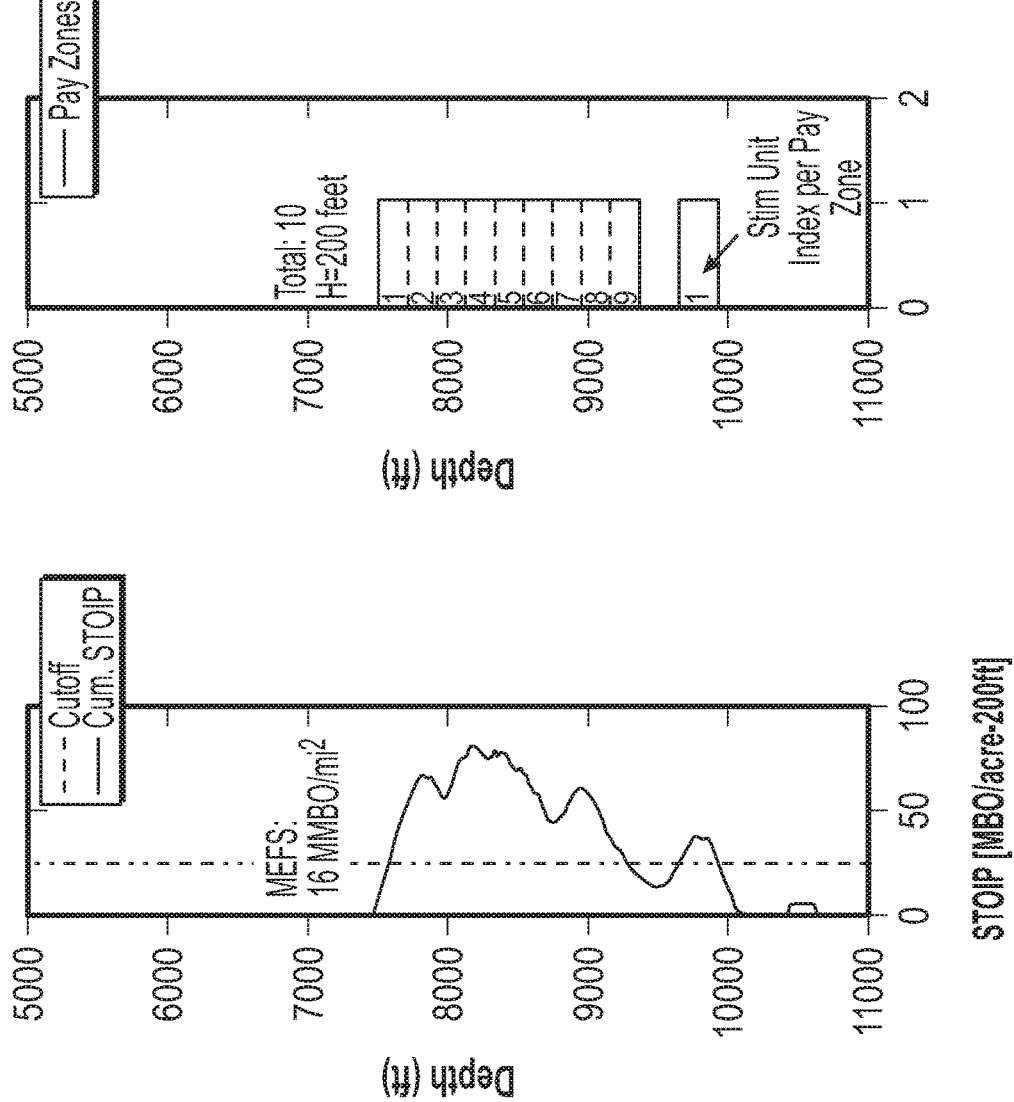
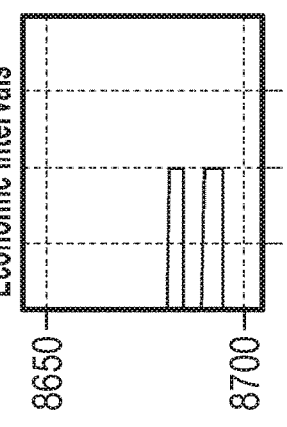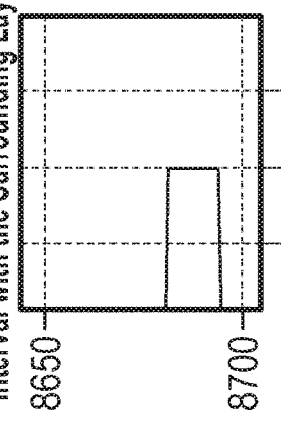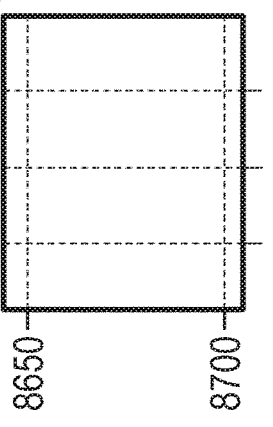
FIG. 8

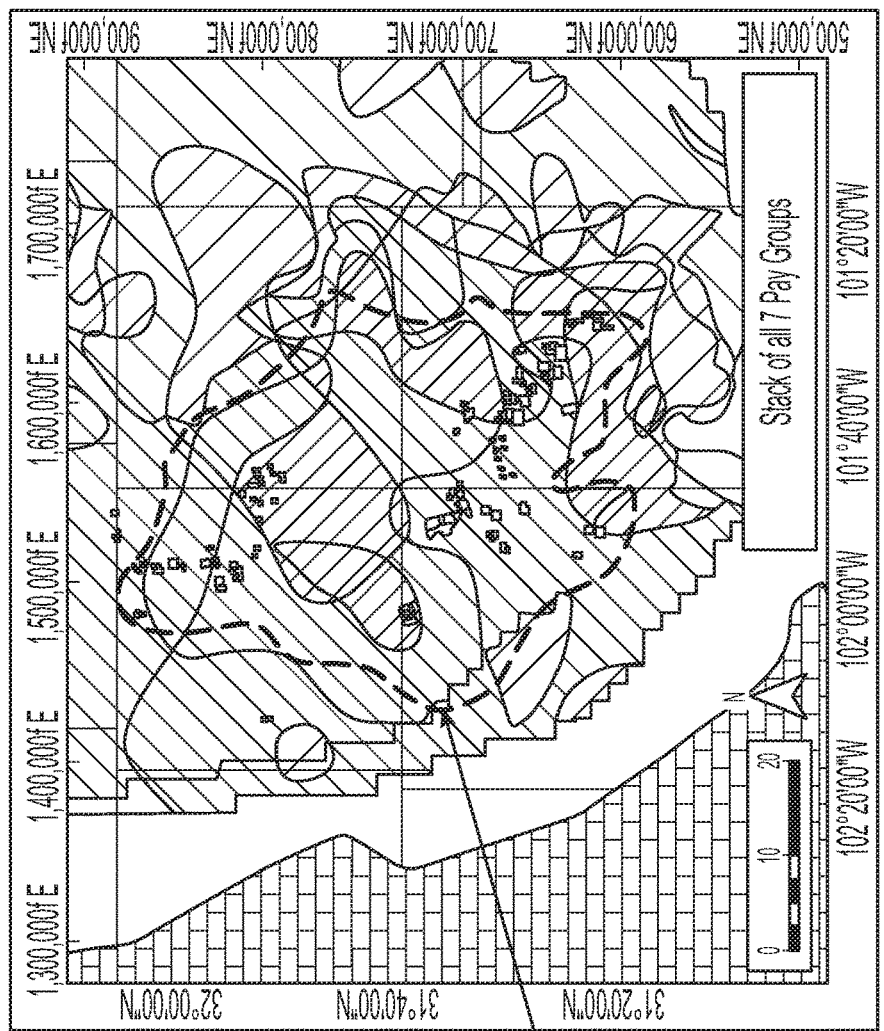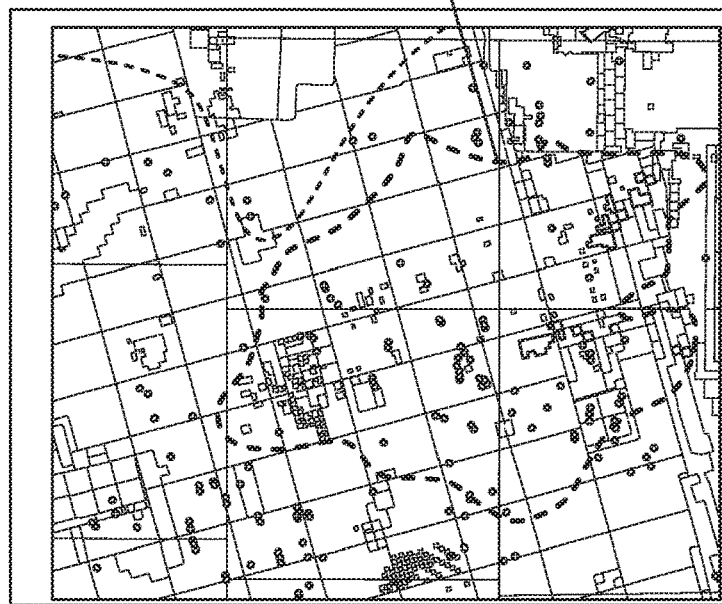
FIG. 11

RESOURCE DENSITY SCREENING TOOL

PRIOR RELATED APPLICATIONS

This application is a non-provisional application which claims benefit under 35 USC § 119(e) to U.S. Provisional Application Ser. No. 62/508,174 filed May 18, 2017, entitled "RESOURCE DENSITY SCREENING TOOL," which is incorporated herein in its entirety.

FIELD OF THE DISCLOSURE

The disclosure relates to tools and methods for oil and gas production plans. Specifically, tools for screening reservoirs, particularly unconventional reservoirs, to determine the best positioning of wells are disclosed.

BACKGROUND OF THE DISCLOSURE

Identifying the optimum geographic and stratigraphic target(s) for oil and gas exploration or development is a critical decision to be made. Drilling of wells is costly, often amounting to hundreds of millions of dollars for a reservoir, depending on the number and types of wells involved. Once wells are drilled, there is no flexibility in changing their surface or stratigraphic position later. The only possible alteration is to drill additional stratigraphic targets or recomplete existing wells, but the surface location will remain unchanged.

Typically, the selection process for locating wells utilizes available technology such as saturation applications, pressure distribution maps, isopach maps, rock quality maps, and so forth. There is an increased focus on quickly identifying the number and quality of potential horizontal target zones in unconventional plays. This processes to improve the quality of wells placement then leads to better decision making.

Assessing well placement is usually a two-step process. The first, and most challenging, step of the process is to identify "sweet spots" in a reservoir. Sweet spots are the most productive position for a horizontal well in terms of both stratigraphic space and map location. The second step includes the optimization formulation or method to be used.

Unconventional reservoirs continue to be a global strategic resource actively exploited by E&P companies. However, in unconventional reservoirs, sweet spot recognition is essential to reducing uncertainty, high-grading acreage, pinpointing the best drilling in the acreage, and improving field economics. Identifying such sweet spots require a detailed understanding of complex reservoir properties and how these properties influence the productivity of the wells. This involves large amounts of data, including stratigraphic horizons, faults, lithological properties, and organic content.

Thus, the most significant challenge for the subsurface screening of unconventional plays, including source rock, hybrid, and tight sand reservoirs, is the determination of the sweet spot. Traditional stratigraphic screening methodologies target the zone with the highest quality rock within a predefined geological formation. A hypothetical horizontal well bore is then centered around this point and the in-place hydrocarbon volumes are calculated using rock quality cutoffs. The hydrocarbon fluid properties are typically dealt with in a stochastic model later in the screening workflow. This method presents several problems:

A target zone principally centered around the highest rock quality may not equate to the stratigraphic sweet spot defined by maximum in-place volumes. The sweet spot will likely include any one zone of reservoir that is of very high quality, but may be more difficult to define when the range and distribution of the reservoir quality is highly variable, as is the case for some hybrid plays with thick and heterogeneous quality reservoir. During the screening process, it is difficult to determine whether a zone with several thin but high quality zones would be better than another with a thick zone of moderate quality rock. In all cases, determining the maximum in-place volume using traditional methods would require iterative forward modeling. The sweet spot should ideally be defined by the integral of in-place volumes across the height of the landing zone.

Only the single best target zone is immediately identified. For unconventional plays, there may be potential for multiple, stacked landing zone targets. For the purpose of exploration screening, any and all intervals that exceeds a user defined minimum in-place volume should be flagged for further investigation.

Excluding the hydrocarbon fluid properties from the stratigraphic sweet spot determination ignores a key risk for many unconventional plays. Certain plays or basins may require specific gas-oil-ratios, viscosity ranges, or working pressures to be economical. Though they do not typically supersede in-place volumes in priority, fluid properties are an important way to characterize potential resources.

Applying rock quality cutoffs (typically for porosity and water saturation) underestimates in-place volumes, especially for low quality rocks. This practice, though appropriate for conventional reservoirs, is commonly used to define a 'net' reservoir with respect to the gross interval. Due to the distributed nature of unconventional reservoirs and the improved completion techniques (e.g. fracture stimulation) being applied to the target zone, we believe it is more appropriate to include the low quality reservoir component in the in-place volumetric calculation and sweet spot identification.

Limiting the screening to pre-defined geological formations (or any other pre-defined zone) may prevent the sweet spot from being identified. Where the maximum in-place volumes straddle a boundary, the accumulation would be reported individually within two separate zones. Therefore, the sweet spot may be missed during the screening process.

The time-consuming iterative nature of the traditional volumetric workflow and the delayed incorporation of fluid properties slow down the screening process. When new logs, rock quality, or fluid properties are incorporated, new analyses and models must be run.

However, further improvements are needed. Even incremental improvements in technology can mean the difference between cost effective drilling and reserves that are unable to recover the economic costs of production. Thus, what is needed are quick and efficient methods of determining the sweet spot. Ideally, the methods can be applied early in the exploration and development phases and can be used with all unconventional plays.

SUMMARY OF THE DISCLOSURE

Described herein is a screening tool primarily for unconventional reservoirs, and its use to maximize the cost effectiveness of drilling and producing hydrocarbon from a reservoir.

Specifically, the tool combines rock property data from a petrophysical model with hydrocarbon fluid properties from a basin model for a given reservoir or play to quickly create volume-in-place curves. These curves can then be used for quantifying the resource density, stacked pay potential, and/or sweet spot locations for unconventional hybrid, tight sand, or source rock reservoir. By estimating resource density, each hydrocarbon molecule in the subsurface, in terms of the surface conditions, can be considered, as well as the quantity of hydrocarbons located at specific depths/formations across the basin. This screening tool can be used to screen hydrocarbon-containing basins from the exploration through early development phases of a particular recovery program.

The screening tool was developed to overcome many of the issues associated with predicting the location of a sweet spot and does just that by: (1) objectively integrating in-place volumes regardless of the vertical variation of reservoir quality; (2) automatically including any other potential target zones in addition to the single best zone; (3) including the fluid properties earlier in the workflow; (4) incorporating volumes from the low quality reservoir (previously excluded by net pay cutoffs); (5) working continuously through formation boundaries; and, (6) allowing for quick calculations and updates as petrophysics and basin models are updated.

The tool's screening process can be broken down into the following steps:

Step 1: Compute/Estimate curves needed for the formation volume factor ($B_T$) calculations. Typically, the curves are already contained in the datasets created by various reservoir evaluation software. However, stacked maps or 2d interpolation of data based on longitude or latitude can also be used to gather information for the curves.

Step 2: Compute the standard tank oil in place (STOIP), Hydrocarbon pore volume (HCPV) and/or in-place hydrocarbons (BVH) using standard equations.

Step. 3: Average and integrate STOIP, BVH, and/or HCPV curves using a moving window with a height equal to the drained height sometimes loosely abbreviated as FracHeight. FracHeight is a user-defined quantity that allows the tool to be run for several different scenarios and also for reservoirs with different characteristics.

Step 4: Apply economic cutoff limits to flag possible pay zones intervals in integrated STOIP, BVH, and/or HCPV curves. The chosen economic cutoff limits can rely on the minimum economic field size.

Step 5: Apply thin-zone discrimination to group non-economic or economical intervals. This thin zone discrimination is meant combine or delete identified zones. If several identified zones are separated by a thin non-pay interval, they may effectively be thought of as a single thicker zone. Alternatively, identified zones may be removed if the identified zone is too thin to land a well, when e.g. the integrated volume in-place curve is noisy about the user defined volume cutoff.

Step 6: Locate stacked pay by re-indexing the grouped thin-zones in step 5. The number of identified zones in step 4 are indexed in terms of depth and thickness before the 'Thin-Zone' discriminator is applied. If any thin zones were combined or removed in Step 5, the program needs to re-index to end up with the final number of identified prospective landing zones. The stacked pay in the STOIP, BVH, and/or HCPV curves is then integrated to find economic zones with the richest amount of hydrocarbons. Additionally, further calculations can be performed to determine the lateral extent of the economic zones having the largest amount of hydrocarbons.

Step 7. Repeat steps 4-6 [or specific sub-steps] with each subsequent subzone from the top of the reservoir to the bottom until all subzones and all wells in the reservoir are screened. Essentially, Steps 1-6 are 'agnostic' scanning of the well, from top to bottom, without notion of geologic formations or boundaries. Step 7 performs the same computations, but within the pre-defined geologic formations. Thus, it serves to give us an optional means of comparing to the traditional methodology.

Step 8: Save curves and write non-curve data to set locations in a spreadsheet such that all data can be accessed by other oil and gas software for further analysis. The screening tool creates new parameter vs. depth curves for each parameter so that they may be used for quality control, further computation outside of the screening tool, and correlation/mapping using third party software.

The code for the screening tool can be written with any coding language, such as JAVA™, JAVASCRIPT™, PERL®, TCL™, SMALLTALK™, C++, or PYTHON™. PYTHON™ is preferable because it is an open-source computing language and readily available. Further, the PYTHON™ language and software has the advantage of being easily integrated with the code used by petrophysical software used for common log analysis, such as TECHLOG™, PETREL™, as well as non-oil and gas software such as MICROSOFT® EXCEL®. It is expected that the results of the screening tool will be used for other analysis techniques that are common for the oil and gas industry. Thus, the need to output results in an easy-to-use, and easily accessibly format is important.

Additionally, the initial data used by the screening tool can come from any of the commercially available or in-house software used for oil and gas reservoir characterization, as well as user inputs. Data from oil and gas software such as TECHLOG™, PETREL™, PETROSYS™, and SPARK™ have also been used in the tool. Further, data from joint industry projects, core, logs, DST, thin sections, isopach, surveys, seismic, analogs, IHS MARKIT®, IHS API Statistical Data, kinetics, fluid samples analyses have all been successfully incorporating into runs by the screening tool. This adds much needed versatility to the screening tool, allowing it to be applied to both conventional and unconventional reservoirs.

Depth profiles for each relevant parameter (e.g. porosity, water saturation, temperature, pressure, API gravity, and gas-oil ratio) in a target play are combined to create volume-in-place and fluid property (viscosity, formation volume factor) curves as a function of the depth. These curves are then combined and evaluated, from top to bottom of the reservoir, for each proposed horizontal and/or vertical well that has input logs and is not limited to geological formation boundaries. The evaluation consists of computing a moving average as well as a moving integration at e.g., a 1-foot resolution from the perspective of a hypothetical horizontal well having a user-defined vertical window. This window size is related to the FracHeight. Example sizes are 100 feet, 200 feet, but large or smaller windows can be used depending on the reservoir and reasonable FracHeight.

While the moving integration of the volume in-place curves is not mathematically a new technique, it has always been limited to within bounded target formations. Here, the inventive screening tool applies the technique by having the moving integrations moved top to bottom in the well in a manner unbounded by geologic formation boundaries.

The resulting cumulative volume in-place curves are used to flag potentially economic accumulations of hydrocarbon, which can also be used to define one or more sweet spots and prioritize other stacked pay zones in each well or formation. The geographic location(s) of wells with sweet spots, the in-place volume of the sweet spots, the number and stratigraphic position of potential stacked target zones, and total in-place hydrocarbon volume (in stock tank conditions) for each well, formation, or any other user-defined zone are determined.

If geologically reasonable, volumetric patterns defining the cumulative volume in-place curves can be correlated and mapped to display vertical and lateral relationships of the interpreted resource groups. Further, the hydrocarbon volumes as estimated under the method with petrophysical model constraints can be compared back to the calculated basin model results for hydrocarbons generated for a mass balance check.

The screening tool uses standard volumetric equations for hydrocarbon bulk volume (Eq. 1), pore volume (Eq. 2), and stock tank oil in place (STOIP) (Eq. 3).

$$BVH = h[\text{ft}] * \varphi_T * (1 - S_W) \qquad \text{Eq. 1.}$$

$$HCPV[BBL] = \frac{43560 \left[\frac{\text{ft}^2}{\text{acre}}\right]}{5.615 \left[\frac{\text{ft}^3}{BBL}\right]} * A[\text{acre}] * h[\text{ft}] * \varphi_T * (1 - S_W) \qquad \text{Eq. 2.}$$

$$STOIP = \frac{43560 \left[\frac{\text{ft}^2}{\text{acre}}\right]}{5.615 \left[\frac{\text{ft}^3}{BBL}\right]} * \frac{A[\text{acre}]}{B_T \left[\frac{BBL}{STB}\right]} * h[\text{ft}] * \varphi_T * (1 - S_W) \qquad \text{Eq. 3.}$$

wherein $S_w$ is connate water saturation (decimal) from log and/or core data; h is height or thickness of the pay zone; A is the area of the reservoir; phi ($\varphi_T$) is the total porosity from log and/or core data; and $B_T$ is the total formation volume factor. The conversion factors are from acre-ft to $\text{ft}^3$ (43560) and from bbl to $\text{ft}^3$ (5.615).

By combining the petrophysical rock properties and basin model fluid properties together earlier in the exploration process and scanning each well from top to bottom, economic hydrocarbon potential based on computed volumes using variable fluid properties with depth can be determined. Net pay cutoffs and geologic formation boundaries are purposely not used when computing volumes in order to minimize uncertainty in the form of interpretation bias. Thus, all of the hydrocarbon modeled to fill the pore space of the rock can be accounted for and compared to a given economically interesting volume and a presumed vertical (e.g. effective drainage height) window.

The screening tool effectively accounts for all modeled hydrocarbon and computes the number of lateral landing zones, hydrocarbon volumes, and sweet spot depths for each well, formation, and sub-formation. The computed values from the tool are then organized in a logical manner and are optimized to fit within the general exploration workflow. Thus, they are ready for further analysis, correlation, and mapping to more thoroughly influence the critical decision making process for land acquisition, anchor zones, competitor analysis, basin focal areas, and prioritized potential development scenarios.

The screening tool also features a thin-pay discriminator, which scans thin potential pay zones surrounded by non-pay intervals. If a thin non-pay interval is sandwiched between two pay intervals, the intervals are combined, whereas if the thin pay is surrounded by non-prospected zones it is rejected. This feature simplifies and combines economic intervals so that stacked pay potential and number of lateral targets can be properly accounted for.

The screening tool then runs a parallel computation, first computing from the volume in-place curves, a mathematically optimized configuration for the number of potential lateral landing zones, their thickness, depth, and hydrocarbon volume, all regardless of the geologic formation. The second part of the parallel computation is the utilization of selected geologic formation boundaries to compute the hydrocarbon volume, the sweet spot size and depth, and potential lateral landing zones within each formation or pre-defined zone.

The final aspect of the screening tool is the organization and reporting of the computed data. The screening tool creates new parameter vs. depth curves for each parameter so that they may be used for quality control, further computation outside of the screening tool, and correlation/mapping using third party software. For instance, these curves can be saved internally within each TECHLOG™ (SCHLUMBERGER®) project. Data unique to each run of the code for a given set of input parameters can be organized and reported in an MICROSOFT® EXCEL® document that is automatically created by the screening tool.

The properties contained in the report and organized separately for each well, formation, and any user-defined zone can include:

The total hydrocarbon volume (in units of column height, reservoir barrels, and stock tank barrels)
  The total hydrocarbon volume exceeding the user-defined cutoffs (in units of column height, reservoir barrels, and stock tank barrels)
  The total number of identified lateral landing zones
  The depth, thickness, geologic formation, and hydrocarbon volume for each identified lateral landing zone
  The depth, thickness, geologic formation, and hydrocarbon volume for the single lateral landing zone "sweet spot" that contains the maximum calculated in-place volume
  Key rock and fluid properties associated with the sweet spot The screening tool can then be re-run under a variety of prospective vertical windows, economic volume scenarios, or thin pay cutoffs to test data sensitivity to these inputs.

An additional benefit of this workflow are the intermediate calculations, which are output and available for visual quality control for other disciplines (e.g. geology or reservoir engineering). For example, the output has been useful for comparison with basin models with regard to how hydrocarbon fluid properties, which vary by depth, affect the calculated surface volumes (STOIP). Visual inspection of the calculated STOIP vs. the in-place volume (BVH) can reveal potential errors and other insights.

Once errors are addressed or the basin/petrophysical models are updated, the screening tool can be quickly re-run. Although computation speed continues to increase and performance is constantly improving, re-evaluation of the resource density can take less than 8-10 seconds per well of computation time on an average modern workstation (16 GB RAM, 3.2 GHz CPU) and well depths up to 17,000 feet.

The advantages of the resource density screening tool include its speed (200+ well computations in less than an hour and improving); minimal formation bias; volumetrics are normalized across a user defined vertical window; and the ability to count all the hydrocarbons (volumetrics computed foot by foot). The automation of the computation to a given list of wells, the thin-pay discrimination, allocation and prioritization of economic volume into separate lateral landing zones, and organization of the output data are unique to this screening tool.

As mentioned above, the presently disclosed resource density screening tool is designed for applications in the exploration to early development phases of oil and gas exploitation. It can be used to help create stacked pay potential and sweet spot maps needed for acreage capture, competitor analysis, business development opportunities, and appraisal. This tool quickly and clearly communicates both the sweet spot and the number/quality of potential stacked target zones in both map and stratigraphic space for plays that would be developed using horizontal wells. Additionally, this tool provides conveniently formatted data to visually inspect the intermediate calculations and assumptions for the volumetric assessment.

The screen tool can also include any of the following features as well:

- The ability to print, display or save the results of the screening tool.
- The use of the screening tool results in a third party reservoir modeling program to predict reservoir performance characteristics, such as fracturing, production rates, total production levels, rock failures, faults, wellbore failure, and the like.
- The use of the screening tool results to design and implement a wellbore drilling program.
- The use of the screening tool results to design and implement a production program.
- The use of the screening tool results to design and implement a hydraulic fracturing program.
- A non-transitory machine-readable storage medium, which when executed by at least one processor of a computer, performs the steps of the method(s) described herein.

Hardware for implementing the inventive methods may include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the MICROSOFT® WINDOWS® 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could also be used, because the processing is less compute intensive than for example, 3D seismic processing.

Alternative implementations may be used as distributed clusters and cloud computing offer new solutions, many different variants can be foreseen where computing is accomplished locally, through distributed clusters, or a combination thereof.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, "sweet spot" refers to the most productive position for a horizontal well in terms of both stratigraphic space and map location.

As used herein, "plays" refers to a group of oil fields or prospects in the same region that are controlled by the same set of geological circumstances. Often, a play (or a group of interrelated plays) occurs in a single petroleum system.

As used herein, "reservoirs" refers to a subsurface body of rock having sufficient porosity and permeability to store and transmit fluids.

"Unconventional reservoir" is an umbrella term for reservoirs whose hydrocarbons are produced by means that do not meet the criteria for conventional production. What has qualified as unconventional at any particular time is a complex function of resource characteristics, the available exploration and production technologies, the economic environment, and the scale, frequency and duration of production from the resource. Unconventional reservoirs include reservoirs containing tight-gas sands, gas and oil shales, coalbed methane, heavy oil and tar sands, and gas-hydrate deposits.

As used herein, "stim units" refers to a unit of rock intended for stimulation (Hydraulic Fracturing) via well completion. It is analogous to a landing zone.

As used herein, "FracHeight" refers to the vertical extent (above the wellbore) that hydraulic fractures created during well completion remain wedged open with 'proppant' sand grains As used herein, "thin-pay discriminator" and "thin-zone discriminator" are used interchangeable to refers to a subroutine algorithm that receives, as input, the depth and thickness of identified zones, and either combines/removes the thin-zones using logic based upon a user-defined cutoff parameter The use of the word "a" or "an" when used in conjunction with the term "comprising" in the claims or the specification means one or more than one, unless the context dictates otherwise.

As used herein a "moving average" refers to a calculation to analyze data points by creating series of averages of different subsets of the full data set.

As used herein a "moving integration" refers to a calculation to analyze data points by creating series of integrations of different subsets of the full data set.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| $B_T$ | total formation volume factor |
| BVH | in-place volume |
| DST | Drill Stem Test |
| GOR | Gas-oil ratio |
| HCPV | hydrocarbon pore volume |
| STOIP | stock tank oil-in-place |

BRIEF DESCRIPTION OF THE DRAWINGS

FIG. 8. Grouping of layers per the screening tool.

FIG. 9 An array interval is also created for thick pay zones containing multiple stimulation units.

FIG. 11 Map of all 7 pays from the Unconventional formation.

DESCRIPTION OF EMBODIMENTS OF THE DISCLOSURE

Figure 1:
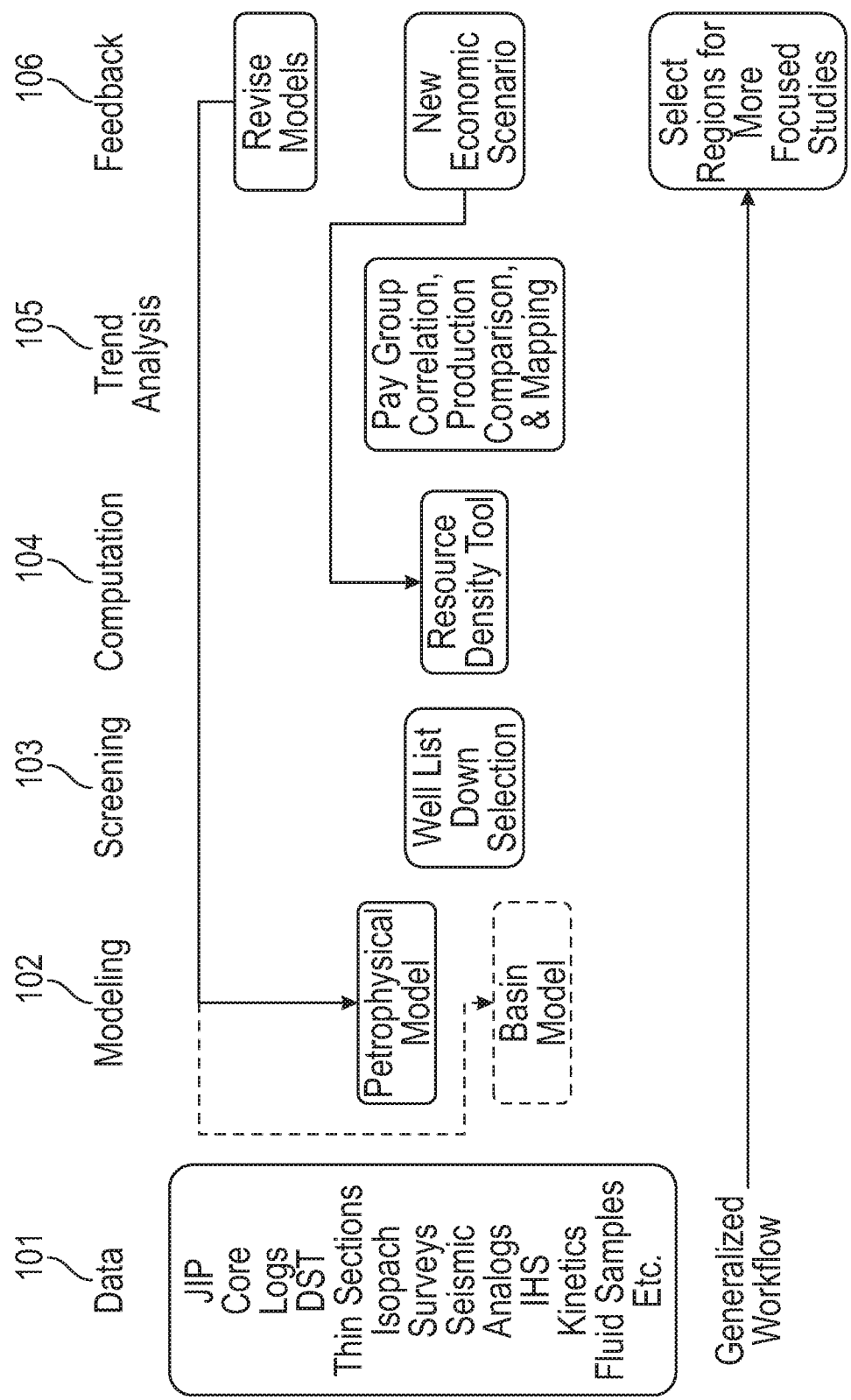
FIG. 1 Schematic of workflow for screening tool.

The invention provides a novel tool for determining the resource density of a hydrocarbon reservoir, particularly an unconventional reservoir, during the early exploration phases.

The present methods includes any of the following embodiments in any combination(s) of one or more thereof:

A method for determining productive areas of a hydrocarbon-containing reservoir that gathers rock property data and hydrocarbon fluid property data for a reservoir and prepares depth profiles for at least one rock property data and at least one hydrocarbon fluid property. These depth profiles are then combined to form volume-in-place curves, which are then evaluated from top to bottom with a vertical window chosen by the user and related to the fracturing height in the reservoir. The curves are evaluated to identify significant accumulations of hydrocarbons in the reservoir and using this information, one or more horizontal or vertical production wells can be drilled into the significant accumulations of hydrocarbons and the hydrocarbon produced.

A method for identifying sweet spots in a hydrocarbon reservoir wherein a petrophysical and a basin model for the reservoir is obtained and depth profiles for at least two parameters in the petrophysical and/or basin model are prepared. The depth profiles are combined to calculate standard tank oil in place (STOIP), hydrocarbon pore volume (HCPV), or in-place hydrocarbons (BVH) curves, or a combination thereof. These curves are then integrated using a moving vertical window with a pre-determined height, wherein the moving vertical window moves from the top of the reservoir to the bottom of said reservoir when it form the integrated curve. An economic cutoff limit is then applied to the integrated curve(s) to form one or more intervals that are then grouped into non-economical or economical intervals by increments of a selected fracture height. Accumulations of hydrocarbons in the economical intervals can then be identified and quantified to determine one or more sweet spot(s), i.e. maximum amounts of hydrocarbon, are located. Eventually, these sweet spots are targeted for well development at the sweet spot and the accumulated hydrocarbons can be produced.

A method for identifying sweet spots in a hydrocarbon reservoir wherein a petrophysical and a basin model for the reservoir is obtained and depth profiles for at least two parameters in the petrophysical and/or basin model are prepared. The depth profiles are combined to calculate standard tank oil in place (STOIP), hydrocarbon pore volume (HCPV), and/or in-place hydrocarbons (BVH) curves. These curves are then integrated using a moving vertical window with a pre-determined height, wherein the moving vertical window moves from the top of the reservoir to the bottom of said reservoir when it form the integrated curve. An economic cutoff limit is then applied to the integrated curve(s) to form one or more intervals that are then grouped into non-economical or economical intervals by increments of a selected fracture height. One or more volumetric patterns in the integrated curve can also be determined using equations 1-3 such that the lateral extent of the groupings can be obtained. Accumulations of hydrocarbons in the economical intervals can then be identified and quantified to determine where one or more sweet spot(s), i.e. maximum amounts of hydrocarbon, are located and considers both the vertical and lateral dimensions of the intervals. A well can then be drilled into the one or more sweet spots or intervals with the largest amount of hydrocarbons and production of the hydrocarbons can commence.

A method for producing hydrocarbons from a reservoir, wherein log and core data, a petrophysical model and a basin model for the reservoir are obtained and combined to provide porosity, water saturation, temperature, pressure, API gravity, and/or gas-oil ratio information. Further, reservoir parameters such as fracture height and minimum economic field size are also determined. The combined data is then used to develop depth profiles for two or more parameters. The depth profiles are then combined to calculate a standard tank oil in place (STOIP), a hydrocarbon pore volume (HCPV), and/or a in-place hydrocarbons (BVH) curve. These curves can be integrated using a moving vertical window with a pre-determined height, typically the fracture height. The moving vertical window moves from the top of the reservoir to the bottom of the reservoir to form an integrated curve. At least one economic cutoff limit based on the user defined minimum economic field size can then be applied to this integrated curve to form one or more intervals. The intervals are grouped into non-economical or economical intervals of a fracture height and one or more volumetric patterns estimated the lateral extent of the economic intervals in the curves are determined using the standard volume equations:

$$BVH = h[ft]^* \varphi_T^*(1 - S_W);$$

$$HCPV[BBL] = \frac{43560 \left[ \frac{ft^2}{acre} \right]}{5.615 \left[ \frac{ft^3}{BBL} \right]} * A[acre]^* h[ft]^* \varphi_T^*(1 - S_W)$$

$$STOIP = \frac{43560 \left[ \frac{ft^2}{acre} \right]}{5.615 \left[ \frac{ft^3}{BBL} \right]} * \frac{A[acre]}{B_T \left[ \frac{BBL}{STB} \right]} * h[ft]^* \varphi_T^*(1 - S_W)$$

The accumulations of hydrocarbons in the economical intervals can then be identified and quantified. One or more wells can then be drilled into the accumulations with the most hydrocarbons and production of the hydrocarbons can begin.

A sweet spot identification system operative to identify regions of economical accumulations of hydrocarbon in a reservoir for subsequent drilling and production of hydrocarbon from the reservoir, including an input system for inputting data including core and log data from a reservoir, a petrophysical model of the reservoir, a basin model of the reservoir, and user-defined production parameters including an economic cutoff limit and a fracture height; an output system for printing, saving or transferring data; a memory for storing this inputted data; a central processor; and computer code stored on the central processor, wherein the computer code is configured to instruct the central processor to identify regions of economical accumulations of hydrocarbons in said reservoir by combining the core and log data, the petrophysical model, and the basin model; preparing depth profiles for at least two parameters in the petrophysical model and the basin model; combining the depth profiles to calculate a standard tank oil in place (STOIP), a hydrocarbon pore volume (HCPV), and a in-place hydrocarbons (BVH) curve; integrating the STOIP, HCPV or BVH curve using a moving vertical window with a pre-determined height, wherein the moving vertical window moves from a top of the reservoir to a bottom of the reservoir to form an integrated curve; applying the economic cutoff limit to the integrated curve to form one or more intervals; grouping the intervals into non-economical or economical intervals by increments of the fracture height; identifying accumulations of hydrocarbons in the economical intervals; quantifying the amount of hydrocarbon in the accumulations; identifying one or more sweet spots as those locations with hydrocarbon maximums in the accumulations; and outputting data.

In any of the above methods can also include the steps of drilling a reservoir into the sweet spot or interval with the most hydrocarbons and producing the hydrocarbon.

In any of the above methods, the reservoir is undeveloped such that the hydrocarbon accumulation can be taken into account early in the exploration and development process.

In any of the above embodiments, the reservoir can be unconventional. This includes hybrid, source rock and tight sand plays. Thus, the identified and produced hydrocarbons can include shale, tight gas, bitumen, coalbed methane, heavy oil and tar sands, and/or gas-hydrate deposits.

In any of the above embodiments, core and log data can be used in combination with the petrophysical and basin models. Further, user-defined parameters such as minimum economic field size and fracture height can be utilized.

In any of the above embodiments, depth profiles can be prepared for a rock property, fluid property, or both. Exemplary properties that are included in the analysis can include porosity, water saturation, temperature, pressure, API gravity, and gas-oil ratio.

In any of the above embodiments, the vertical window is user defined and is often the fracture height. Further, the moving average and a moving integration can be performed using a 1-foot resolution from the perspective of a hypothetical horizontal well having said user-defined vertical window.

Determining the sweet spot of a given area has typically been delayed until the development phases of a project when more rock core data and production data are available. At this point in the development process, vertical variations in resource density are typically measured over long sections of vertical core using routine core analysis and geochemical extraction.

Further, net pay computations are performed on every exploration target within the petrophysical model using porosity and water saturation cutoffs driven by calibration to core plug data and mapped sand/source rock facies thickness. These cutoffs have typically been constrained between specific formation or facies boundaries. As such, use of net pay cutoffs introduces interpretation bias and can underestimate the contributing pore volume to production, and even separate the accumulated resource into separate decision maps.

Because of these limitations, producing a map of the resource density, stacked pay potential, and sweet spot location has been limited to stacking maps of the modeled hydrocarbon volumes within each formation. This approach has been found to significantly underestimate stacked pay in thicker, unconventional formations such as the Wolfcamp of the Delaware and Midland basins or the Niobrara formation of the Uinta-Piceance basin, where the thickness exceeds what can reasonably be stimulated by a single lateral used in the maps. Additional errors related to the type of reservoir were also introduced by this method.

To overcome these limitations, a novel tool was developed to quickly and efficiently evaluate stacked pay potential in hybrid systems by estimating resource density. Specifically, this invention combines the modeled rock data from the petrophysical model and the modeled fluid data from the basin model to compute volume in-place curves using a code written in the open-source computing language of PYTHON™, which is easily integrated with code from the petrophysical software used for all log analysis.

This tool is an improvement because it does not utilize net pay cutoffs and it evaluates the resource potential from the vantage point of a horizontal well, not vertical logs. Previously, standard practice net pay cutoffs of a minimum porosity and maximum water saturation would dismiss hydrocarbon that would ultimately contribute to the well flow volumes. The cutoffs are also affected by the measurement uncertainties involved. The only cutoffs involved in the presently described screening tool are those used to determine what in-place volumes the user would find "interesting" for the screening objective (potentially related to economics or an arbitrary threshold). The "interesting" volume flags are used to locate the top, bottom, thickness, and in-place volumes (in terms of stock tank conditions) of prospective pay zones.

The purpose of estimating resource density is to account for each hydrocarbon molecule in the subsurface, in terms of the surface conditions, and the quantity located at specific depths/formations across the basin, quickly. The results are then exportable in a format accessible by other oil and gas software or, even non-oil and gas specific software such as EXCEL®, for use in further reservoir characterization.

The present invention is exemplified with respect to the following example for a unconventional reservoir. However, this is exemplary only, and the invention can be broadly applied to any unconventional or conventional reservoir. The following is intended to be illustrative only, and not unduly limit the scope of the appended claims.

FIG. 1 displays the technical workflow of the disclosed screening tool. Data from any number of techniques commonly used to characterize a reservoir (101) can be used to construct models (102) that are critical to computing pore volume and potential fluids (if the basin model exists).

From there, the wells being computed by the models are properly screened so as to avoid propagating misinformation (103). This is an important step in this process because any misinformation can induce error into the final results.

After applying the disclosed resource density tool (104) to the models, trends in the pay curves can be identified (105), and the user can attempt to correlate the trends across the basin, and compare with the geologic models & production. Based on any noticeable trends or red flags, regions can be high graded for additional study, or revisions to the models/economic cutoffs can be made and the tool (104) can be reapplied.

Figure 2:
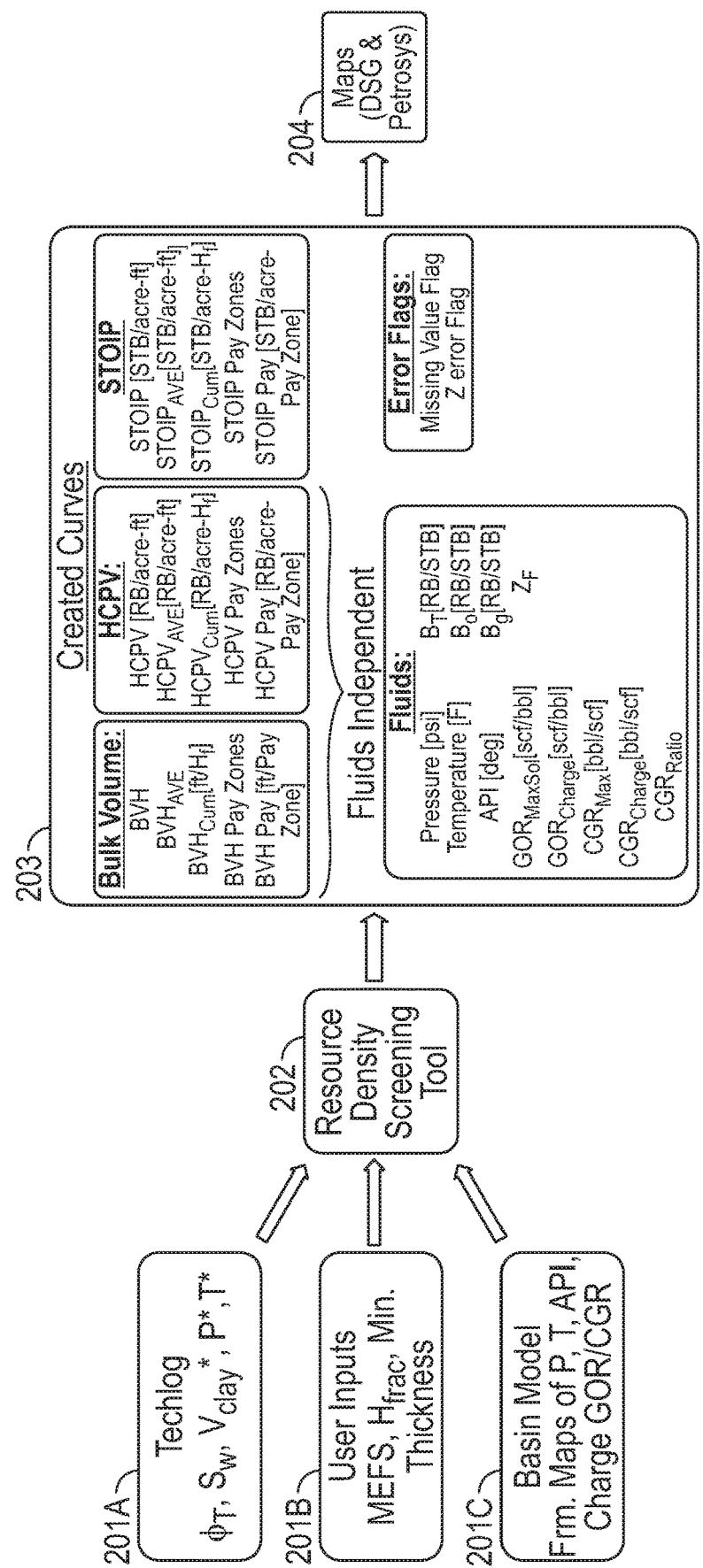
FIG. 2 Example of a workflow for the screening tool as applied to an unconventional formation.

The screening tool was applied to data obtained from an unconventional reservoir. FIG. 2 gives an overview of the specifics used in the workflow of the tool. Here, data from TECHLOG™ Software (SCHLUMBERGER®) (201A), a common basin model (201C), and user inputs (201B) were combined and inputted into the tool (202). The tool (202) was then applied to the data and a plurality of volume-in-place curves (203) were developed to describe the reservoir as a function of depth. For this example, the curves include fluid independent bulk volume and hydrocarbon pore volume curves (HCPV), as well as STOIP, fluids, and error flags.

The data curves were then combined and evaluated, from top to bottom of the reservoir, for each well that has input logs and was not limited to geological formation boundaries. From there, maps of the hydrocarbon in place were developed (204). Because the tool was initially created using PYTHON™ language, the results are easily viewable in commercially available software such as PETROSYS™ and DSG.

Figure 3A:
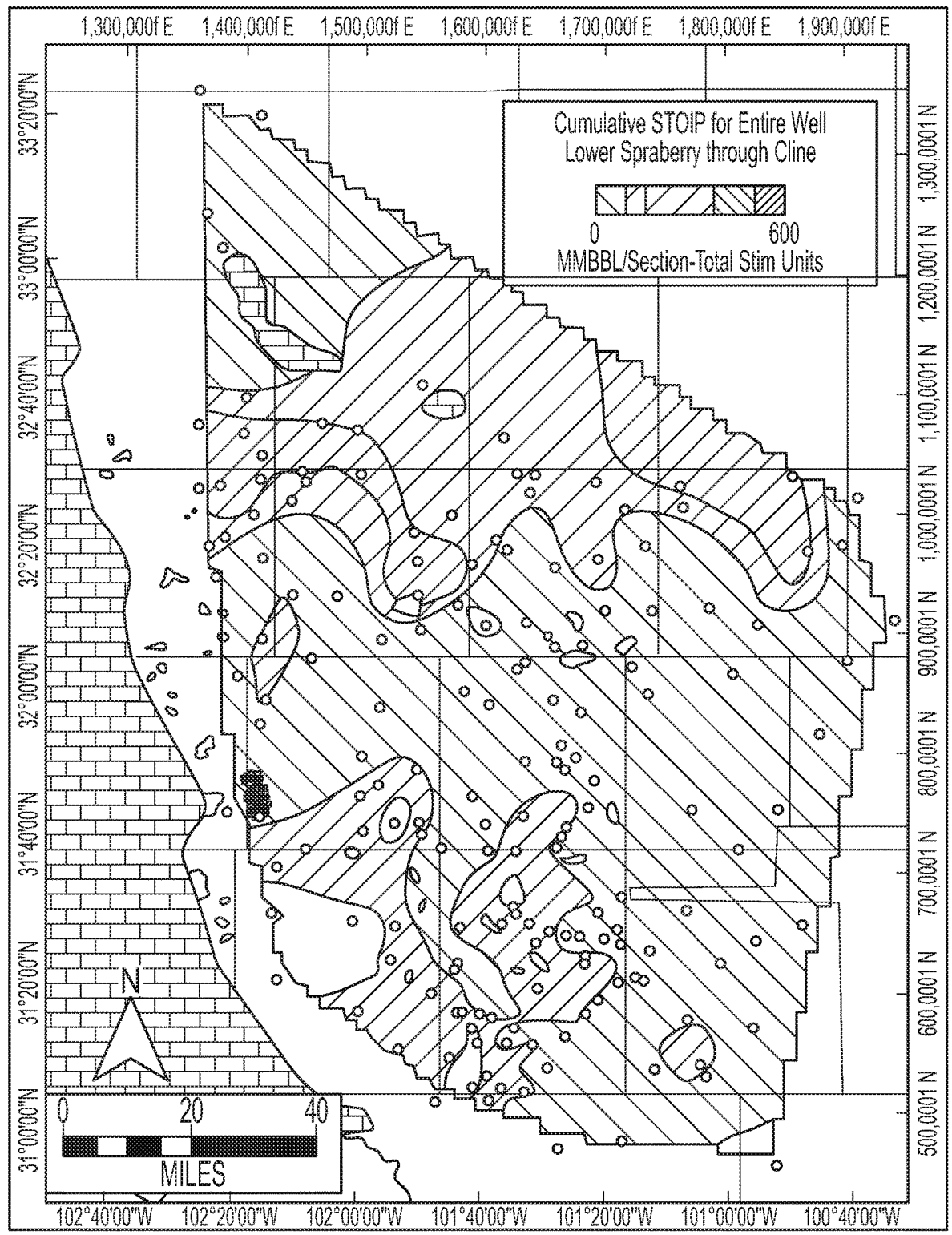
FIG. 3A is a heat map of the cumulative STOIP exceeding the economic cutoff.
Figure 3B:
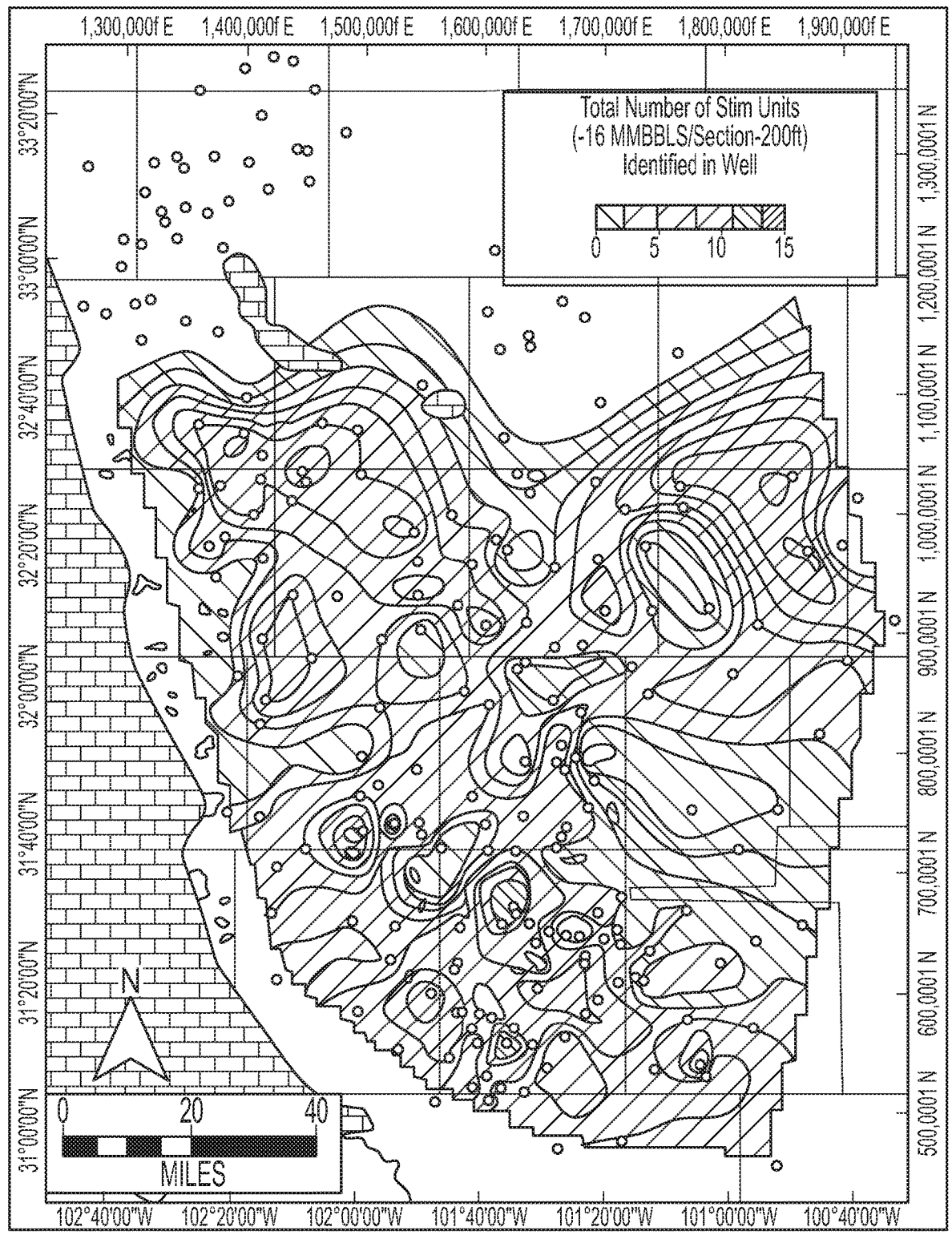
FIG. 3B is a map of the total number of potential vertical landing zones exceeding the economic cutoff; and, FIG. 3C is a stacked map of Pay Group lateral extents exceeding the economic cutoff.
Figure 3C:
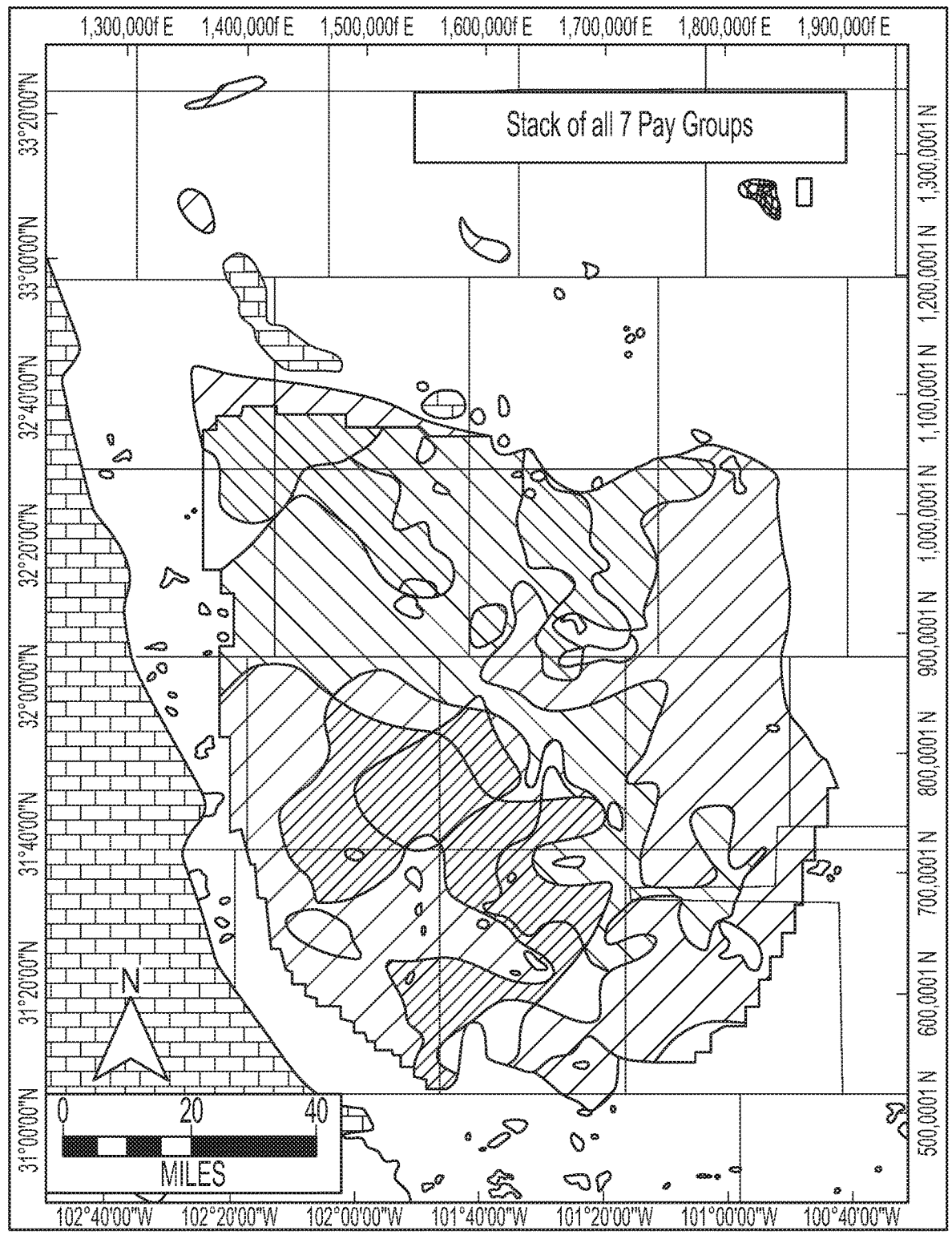

FIG. 3A-C displays exemplary maps created using data provided by the screening tool and then mapped by PETROSYS™. FIG. 3A is a heat map of the cumulative STOIP exceeding the economic cutoff; FIG. 3B is a map of the total number of potential vertical landing zones exceeding the economic cutoff; and, FIG. 3C is a stacked map of Pay Group lateral extents exceeding the economic cutoff.

Figure 4A:
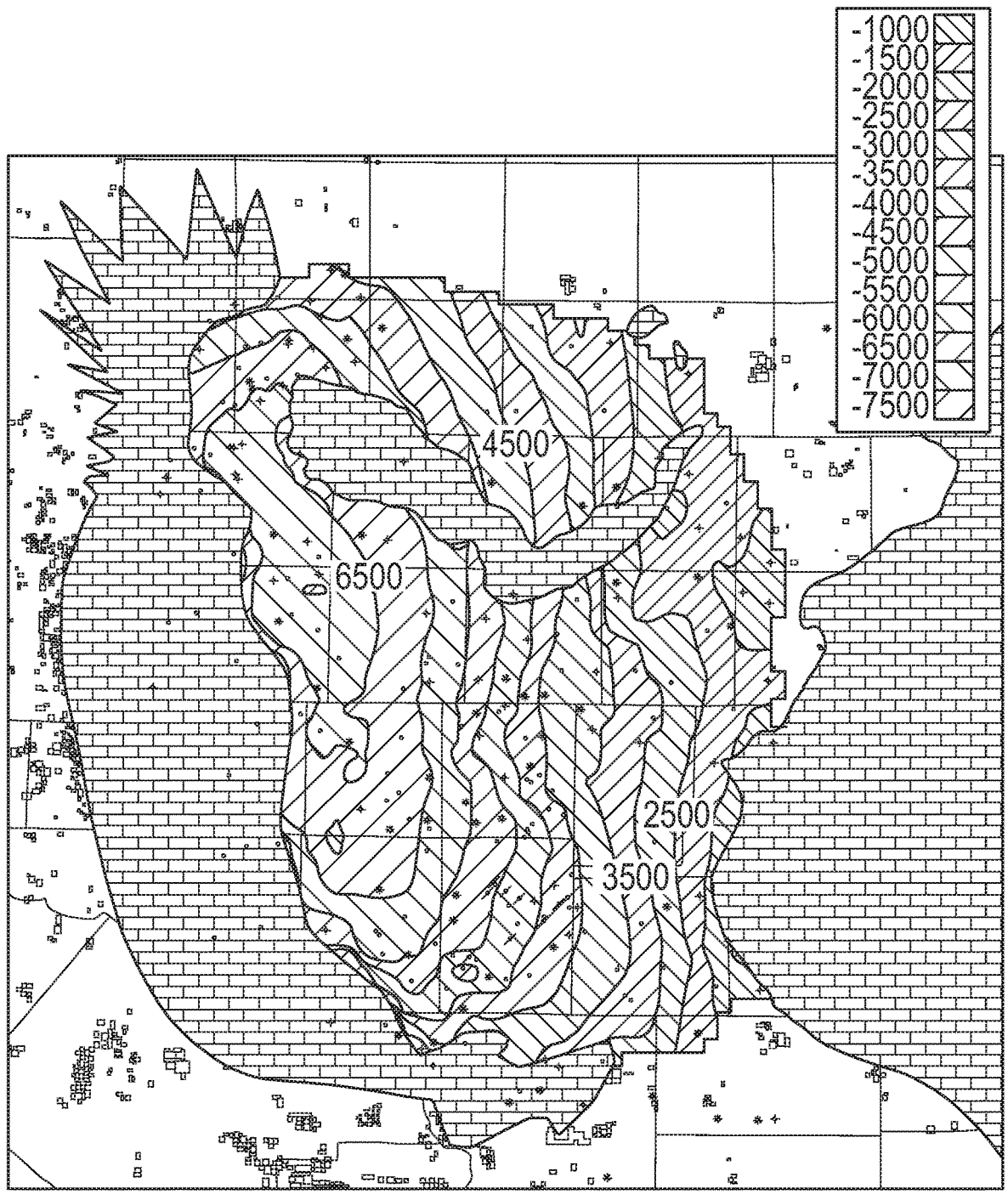
FIG. 4A Depth structure of the Unconventional reservoir.
Figure 4B:
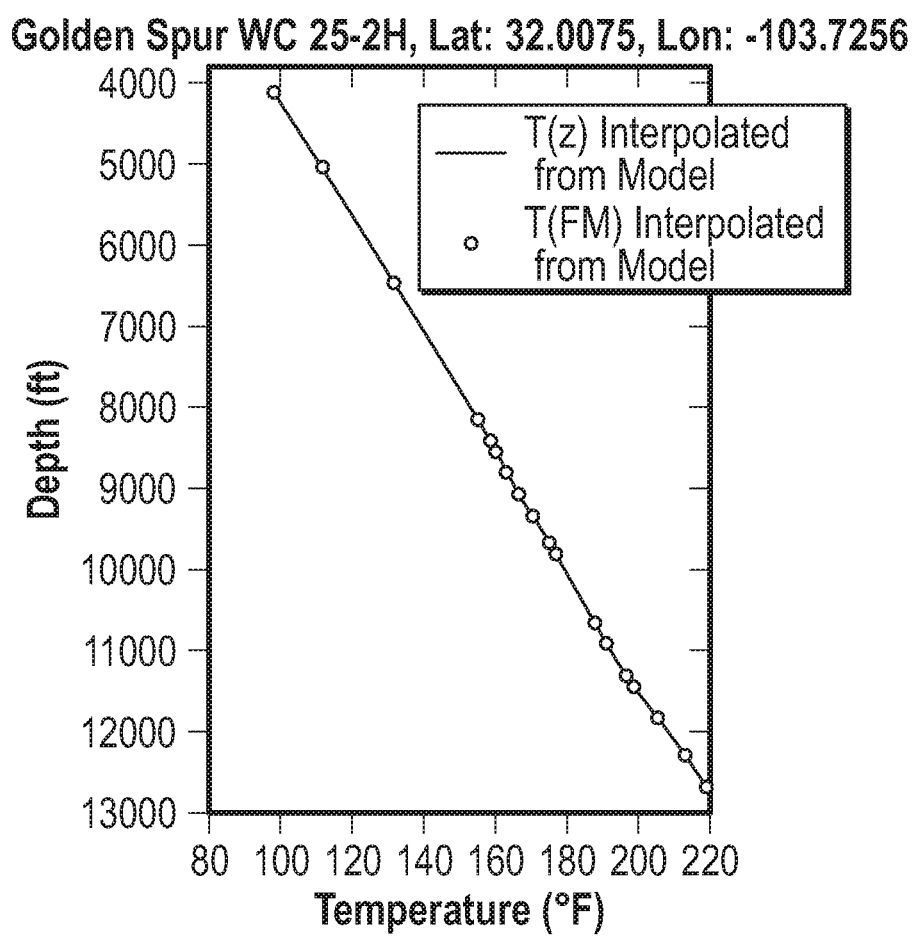
FIG. 4B Temperature-depth curve for the Unconventional reservoir for the first play.

In more detail, the first step the tool performs once the data is inputted is computing or estimating data curves needed for the formation volume factor. An exemplary data set for the depth structure of the Unconventional reservoir is shown in FIG. 4A. If curves are not already in the dataset, then the 'stacked map' approach or 2D interpolation of data based on well latitude or longitude can be used for a stack of pressure maps. Often, the Vasquez-Beggs correlations up to a Maximum Solution Gas-oil ratio (GOR) of 3200 can be used. Using the formation top depth and output array for each parameter value, a curve with respect to depth can then be calculated. An exemplary curve for temperature is shown in FIG. 4C.

Figure 5:
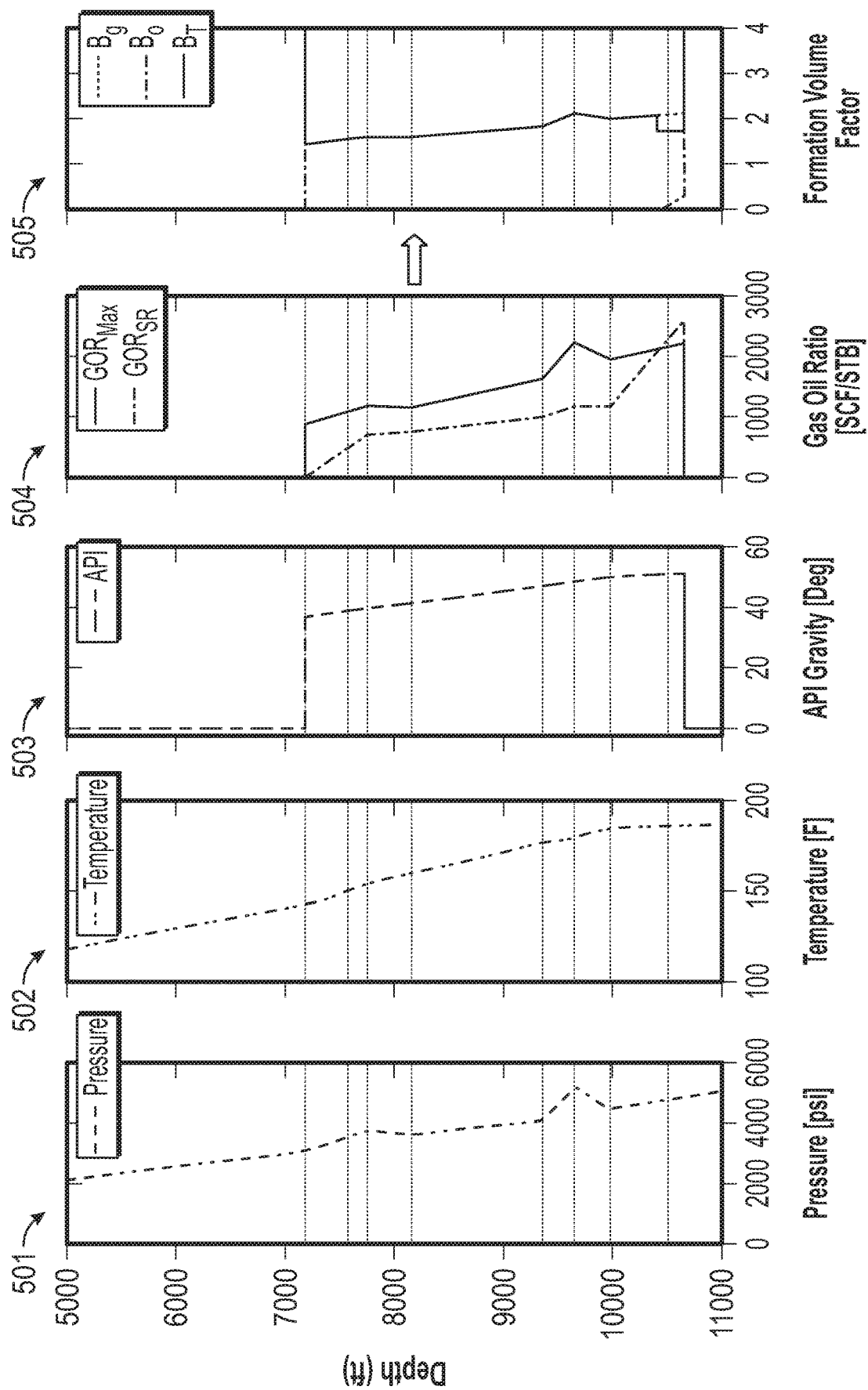
FIG. 5 displays exemplary data curves for the unconventional reservoir that are being combined to form a basin curve for screening by the present tool.

Using the formation top depth and output arrays of each parameter value, a combined data curve with respect to depth can then be calculated. FIG. 5 displays various parameter curves as a function of depth, wherein (501)=pressure, (502)=temperature, (503)=API gravity, (504)=gas oil ratio. These curves were then combined through the use of Vasquez-Beggs correlations to model total formation volume factor ($B_T$) as a function of depth (505).

For the Unconventional reservoir, the $B_T$ was 4 when the API gravity and Gas Oil Ratio was zero. The value of 4 was arbitrarily chosen for depths of the well where we have no information regarding the API gravity or GOR. A high value of 4 was selected as it would stand out from normal ranges of the total formation volume factor. However, any reasonable value can be used.

Figures 6, 7:
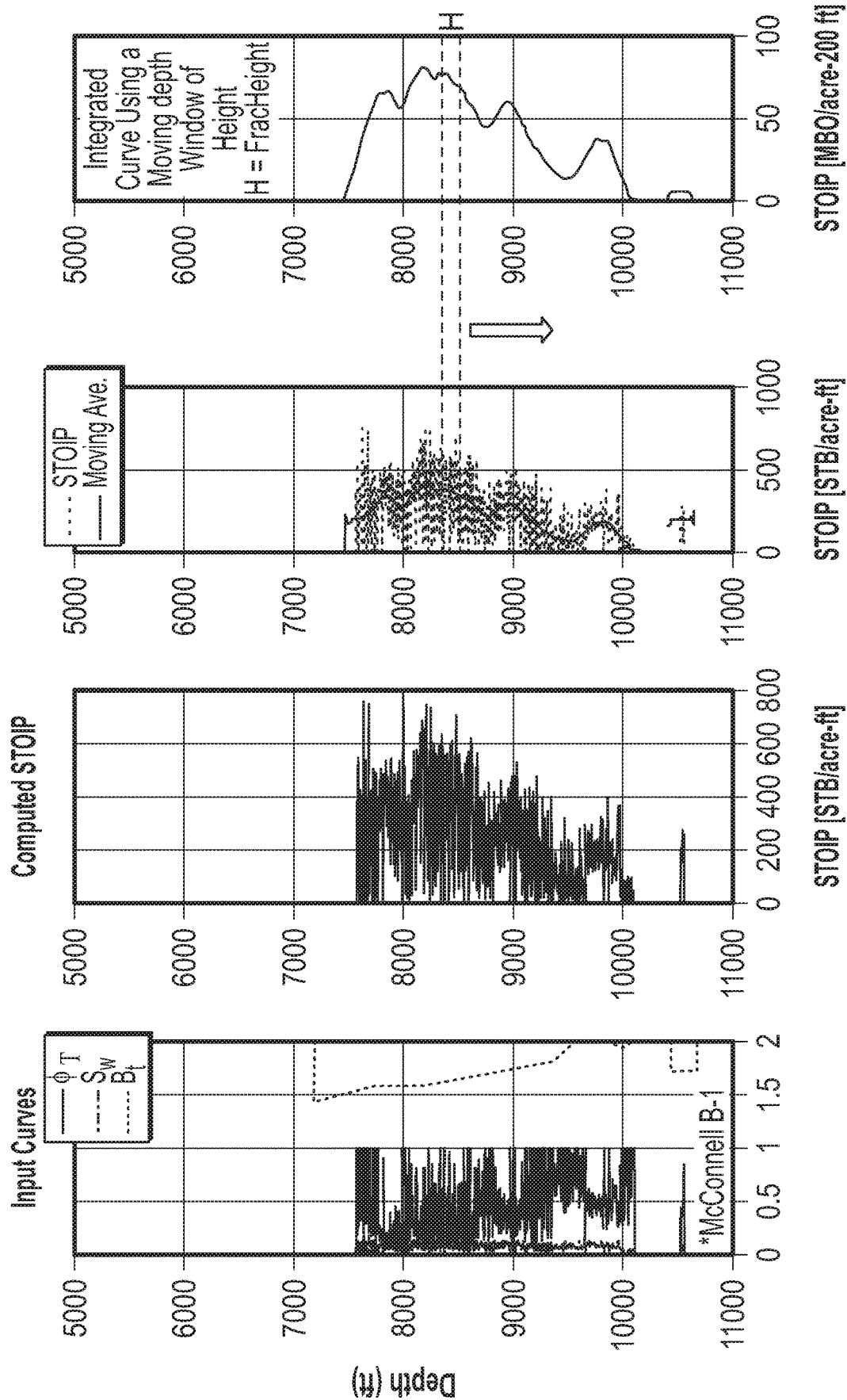
FIG. 6 Input curve and calculated STOIP curve provided by the screening tool.
FIG. 7 A snapshot STOIP curve as it is being integrated with a moving depth window by the screening tool.

The next step performed by the screening tool is to compute the STOIP using equation 3. The porosity and water saturation were limited to physical ranges between 0 and 1. On a foot by foot basis, the STOIP was calculated with A=1 acre and using each of the modeled or computed curves as a function of depth. FIG. 6 displays the input curves and the resulting computed STOIP curve. The same approach is then used to calculate the BVH and HCPV in Equations 1 and 2. The order of calculation is exemplary only.

From there, a moving window with a height equal to the input 'FracHeight' is used to compute the integral for the STOIP (or BVH or HCPV) curve using numerical summations, per FIG. 7. Moving integrated cumulative curves are computed at 1-foot resolution without porosity or water saturation net pay cutoffs, which permits the inclusion of all hydrocarbon. Here, a fracture height of 200 ft was used. As fracture height is dependent on the reservoir and stimulation, this is a user-defined parameter and any fracture height can be used with the tool.

This new integrated curve is used to locate zones of interest. Economic cutoffs are applied to flag possible pay zones. Typically, such cutoffs are based on user-defined minimum economic field size, e.g. 10 million barrels of oil. Values exceeding the cutoff (>10 million barrels of oil) are assigned a value of 1, while everything else is 0, to digitize the array. Any minimum economic field size can be used and the suggested 10 million barrels of oil is only exemplary.

Digitizing the array aids in indexing the depths to these "Stim" units. The first derivative can be taken. Positive values are stim unit top, negative values are stim unit bottom, and differences are the thickness of stim unit. Thus, an array for each "stim unit" has tops, bottoms, and thicknesses.

The stim unit top, bottom, and thickness are fed into the thin-pay discriminator to see if any identified stim units are thin enough to be combined or rejected. After this, they are re-indexed and the thick intervals (usually greater than 2× the fracture height) are subdivided into the whole number of 'stim units' that can fit within the thick interval. The total number of potential landing zones, per well, is taken from the sum of all of the identified 'stim units'.

In areas where the integrated STOIP curve is noisy about the cutoff, a thin-zone discriminator is used to assist in grouping the stim units. If a thin non-pay interval is sandwiched between two pay intervals, the intervals are combined, whereas if the thin pay is surrounded by non-prospective zones, it is rejected. This feature simplifies and combines economic intervals so that stacked pay potential and number of lateral targets can be properly accounted for.

The screening tool uses the indexed pay zone flags and non-pay (inverse of payzone curve) to compare the flags to the thin-zone limit. The thin non-pay zones are converted into pay zones if they are smaller than the thin-zone maximum thickness. If the pay zones are less than the thin-zone limit, then the discriminator eliminates them as targets, as shown in FIG. 8. In this example, the thin-zone discriminator used a minimum threshold of 10 ft (i.e. pay less than 10 feet between two non-pay zones are discarded).

The re-indexed pay packages are then divided by the input fracture height to estimate the remaining number of stim units and locate stacked pay. The screening tool has a minimum stim unit thickness so that intervals less than a predetermined number of feet are discarded. For this example, a minimal threshold thickness was 75 ft. This means that even if a stim unit or a combined set of thin stim units were less than 75 feet, they would be ignored. Thus, the minimum stim unit thickness is more or less a sensitivity parameter in case the code was finding everything to be prospective and is user defined. Thus, minimal threshold thicknesses for the stim unit can be selective from 10 to 500 ft or higher.

An array interval is also created for thick pay zones containing multiple stim units, per FIG. 9, which aids in the organization of the data and eases computation. These boundaries are then applied to the original STOIP curve, wherein these regions are integrated to find the richest depth in the well. The sweet spot is located at the depth of the maximum magnitude along the integrated STOIP curve.

The previous steps are repeated for additional tops until the bottom is reached. The results from each subzone are summed to represent the main zone. Thus, the richest frackable interval(s) within each subzone and main zone are identified.

Figure 10:
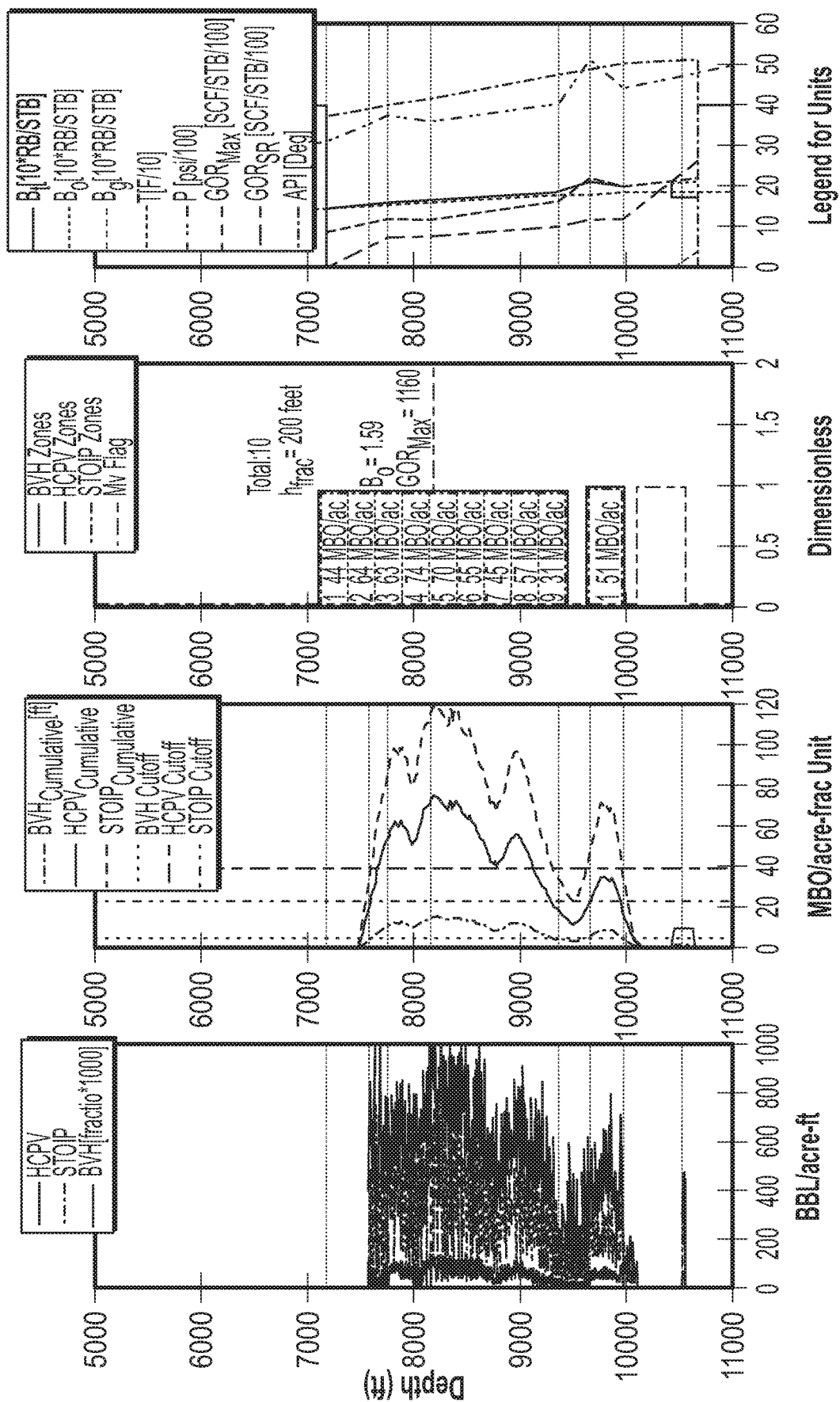
FIG. 10 Final curves for the BVH, HCPV, and STOIP after screening by the tool.

FIG. 10 displays the final curves for the BVH, HCPV, and STOIP after screening by the tool. The sweet spot is identified at a depth of about 8,250 ft as indicated by a red dashed line in the third graphical column. Within that main zone, the subzone with the richest interval is the $4^{th}$ from the top. FIG. 11 displays the stack of all 7 pay groups from Unconventional formation as a result of lateral correlation of patterns found in the cumulative STOIP curve (dark blue curve in the $2^{nd}$ graphical column of FIG. 10) using Eq. 1-3. The core acreage contains a number of sweet spots for drilling horizontal oil wells.

The properties contained in the report and organized separately for each well, formation, and any user-defined zone include:
  The total hydrocarbon volume (in units of column height, reservoir barrels, and stock tank barrels);
  The total hydrocarbon volume exceeding the user-defined cutoffs (in units of column height, reservoir barrels, and stock tank barrels);
  The total number of identified lateral landing zones;
  The depth, thickness, geologic formation, and hydrocarbon volume for each identified lateral landing zone;
  The depth, thickness, geologic formation, and hydrocarbon volume for the single lateral landing zone "sweet spot" that contains the maximum calculated in-place volume; and
  Key rock and fluid properties associated with the sweet spot.

Further, the output for each run can be saved and opened in most third party oil and gas software for use in further characterizations of the well, reservoir, and/or formation.

The following references are incorporated by reference in their entirety:
U.S. Pat. No. 8,483,965, Bradley, et al., "Method and Apparatus for Detection of Hydrocarbon Deposits,"
U.S. Pat. No. 8,640,771, Pope, et al., "Determination of Coal Bed Natural Gas Production Factors and a System to Determine Same,"
US20150301219, Bryndzia, et al., "Methods for Estimating Resource Density by Integrating Seismic Methods with Fluid Density and Pressure in Shale Resource Plays."

The invention claimed is:

1. A method for determining hydrocarbon-containing reservoir productive areas comprising:
  gathering rock property data and hydrocarbon fluid property data for an undeveloped reservoir;
  preparing depth profiles for at least one rock property data and at least one hydrocarbon fluid property;
  combining said depth profiles to form at least one volume-in-place curve;
  evaluating said at least one volume-in-place curve from top to bottom of a vertical window;
  identifying accumulations of hydrocarbons in said undeveloped reservoir; and,
  drilling a horizontal or vertical production well into said identified accumulations.

2. The method of claim 1, wherein said undeveloped reservoir is unconventional.

3. The method of claim 1, wherein said undeveloped reservoir is a hybrid, source rock, or tight sand play.

4. The method of claim 1, wherein said evaluating step involves calculating a moving average and a moving integration from a perspective of a hypothetical horizontal well having said vertical window.

5. The method of claim 4, wherein said vertical window is a fracture height.

6. The method of claim 1, wherein said at least one rock property data and said at least one hydrocarbon fluid property are derived from at least one of log and core data, a petrophysical model or a basin model.

7. The method of claim 1, wherein said depth profiles include porosity, water saturation, temperature, pressure, API gravity, and gas-oil ratio.

8. The method of claim 1, wherein said combining step also forms a fluid property curve.

9. The method of claim 1, further comprising step g) producing hydrocarbons.

10. The method of claim 9, wherein said hydrocarbons include one or more of shale, tight gas, bitumen, coalbed methane, heavy oil and tar sands, and gas-hydrate deposits.

11. The method of claim 1, wherein said evaluating step further includes determining a lateral extent of volume of hydrocarbon.

12. A method for identifying one or more sweet spots in a hydrocarbon reservoir comprising:
  gathering a petrophysical model and a basin model for said hydrocarbon reservoir;
  preparing depth profiles for at least two parameters in at least one of said petrophysical model or said basin model;
  combining said depth profiles to calculate a standard tank oil in place (STOIP) curve, a hydrocarbon pore volume (HCPV) curve, an in-place hydrocarbons (BVH) curve or a combination thereof;
  integrating said STOIP curve, said HCPV curve or said BVH curve using a moving vertical window with a pre-determined height, wherein said moving vertical window moves from a top of said hydrocarbon reservoir to a bottom of said hydrocarbon reservoir to form an integrated curve;
  applying at least one economic cutoff limit to said integrated curve to form one or more intervals;
  grouping said one or more intervals into non-economical intervals or economical intervals by increments of a fracture height;
  identifying accumulations of hydrocarbons in said economical intervals;
  quantifying an amount of said hydrocarbons in said accumulations; and
  identifying said one or more sweet spots based on said amount of said hydrocarbons, said one or more sweet spots corresponding to one or more locations with hydrocarbon maximums in said accumulations.

13. The method of claim 12, further comprising drilling one or more wells into said one or more locations corresponding to said one or more sweet spots.

14. The method of claim 13 further comprising producing said hydrocarbons.

15. The method of claim 12, wherein said depth profiles include porosity, water saturation, temperature, pressure, API gravity, gas-oil ratio, or a combination thereof.

16. The method of claim 12, wherein said hydrocarbons include at least one of shale, tight gas, bitumen, coalbed methane, heavy oil and tar sands, or gas-hydrate deposits.

17. A method for determining productive areas of a hydrocarbon-containing reservoir comprising:
gathering a petrophysical model and a basin model for said hydrocarbon-containing reservoir;
preparing depth profiles for at least two parameters in at least one of said petrophysical model or said basin model;
combining said depth profiles to calculate a standard tank oil in place (STOIP) curve, a hydrocarbon pore volume (HCPV) curve, an in-place hydrocarbons (BVH) curve or a combination thereof;
integrating said STOIP curve, said HCPV curve or said BVH curve using a moving vertical window with a pre-determined height, wherein said moving vertical window moves from a top of said hydrocarbon-containing reservoir to a bottom of said hydrocarbon-containing reservoir to form an integrated curve;
applying at least one economic cutoff limit to said integrated curve to form one or more intervals;
grouping said one or more intervals into non-economical intervals or economical intervals of a fracture height;
determining one or more volumetric patterns in said integrated curve to estimate a lateral extent of said economical intervals;
identifying accumulations of hydrocarbons in said economical intervals;
quantifying an amount of said hydrocarbons in said accumulations;
drilling a well into said accumulations with a largest amount of hydrocarbons; and
producing said hydrocarbons.

18. The method of claim 17, wherein said gathering step also includes gathering log and core data for said hydrocarbon reservoir.

19. The method of claim 17, wherein said depth profiles include porosity, water saturation, temperature, pressure, API gravity, gas-oil ratio, or a combination thereof.

20. The method of claim 17, wherein said pre-determined height is said fracture height.

21. The method of claim 17, wherein said economic cutoff limit is a user-defined minimum economic field size.

22. The method of claim 17, wherein said hydrocarbons include at least one of shale, tight gas, bitumen, coalbed methane, heavy oil and tar sands, or gas-hydrate deposits.

23. A method for determining productive areas of a hydrocarbon-containing reservoir comprising:
obtaining log and core data from said hydrocarbon-containing reservoir;
defining a fracture height and a minimum economic field size for said hydrocarbon-containing reservoir;
gathering a petrophysical model and a basin model for said hydrocarbon-containing reservoir, wherein at least one of said petrophysical model or said basin model includes at least one of porosity, water saturation, temperature, pressure, API gravity, or gas-oil ratio parameters;
preparing depth profiles for at least two parameters in at least one of said petrophysical model or said basin model;
combining said depth profiles to calculate a standard tank oil in place (STOIP) curve, a hydrocarbon pore volume (HCPV) curve, an in-place hydrocarbons (BVH) curve or a combination thereof;
integrating at least one of said STOIP curve, said HCPV or said BVH curve using a moving vertical window with a height equal to said fracture height, wherein said moving vertical window moves from a top of said hydrocarbon-containing reservoir to a bottom of said hydrocarbon-containing reservoir to form an integrated curve;
applying said minimum economic field size as an economic cutoff limit to said integrated curve to form one or more intervals;
grouping said one or more intervals into non-economical intervals or economical intervals of a fracture height;
determining one or more volumetric patterns in said integrated curve to estimate a lateral extent of said economical intervals;
identifying accumulations of hydrocarbons in said economical intervals;
quantifying an amount of said hydrocarbon in said accumulations; and
drilling one or more wells into said accumulations based on said amount of said hydrocarbons.

24. A sweet spot identification system operative to identify regions of economical accumulations of hydrocarbon in a reservoir for subsequent drilling and production of hydrocarbon from said reservoir, the sweet spot identification system comprising:
an input system for inputting data including core and log data from a reservoir, a petrophysical model of said reservoir, a basin model of said reservoir, and production parameters including an economic cutoff limit and a fracture height;
a memory for storing said data input using said input system; and
a central processor executing instructions to cause a computer system to perform operations comprising:
combining said core and log data, said petrophysical model, and said basin model;
preparing depth profiles for at least two parameters in said petrophysical model and said basin model;
combining said depth profiles to calculate a standard tank oil in place (STOIP) curve, a hydrocarbon pore volume (HCPV) curve, and an in-place hydrocarbons (BVH) curve;
integrating at least one of said STOIP curve, said HCPV curve or said BVH curve using a moving vertical window with a pre-determined height, wherein said moving vertical window moves from a top of said reservoir to a bottom of said reservoir to form an integrated curve;
applying said economic cutoff limit to said integrated curve to form one or more intervals;
grouping said one or more intervals into non-economical intervals or economical intervals by increments of said fracture height;
identifying accumulations of hydrocarbons in said economical intervals;
quantifying an amount of hydrocarbon in said accumulations; and
identifying one or more sweet spots based on said amount of hydrocarbon, said one or more sweet spots corresponding to one or more locations with hydrocarbon maximums in said accumulations.

* * * * *